2,986,936
POWER ELEMENT CONSTRUCTION
Sergius Vernet, Yellow Springs, Ohio, assignor to Antioch College, Yellow Springs, Ohio, a corporation of Ohio
Filed May 9, 1956, Ser. No. 583,788
1 Claim. (Cl. 73—358)

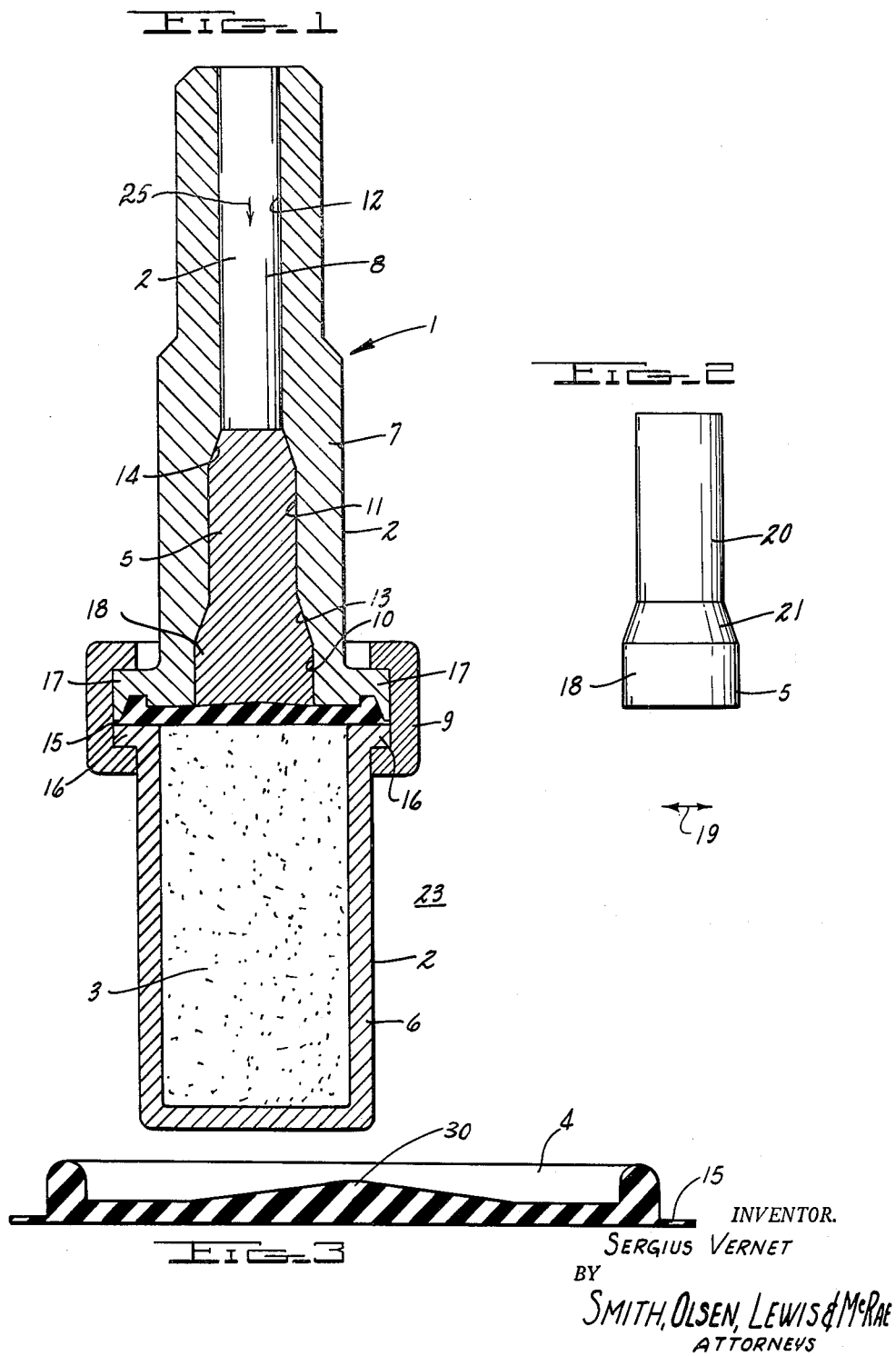

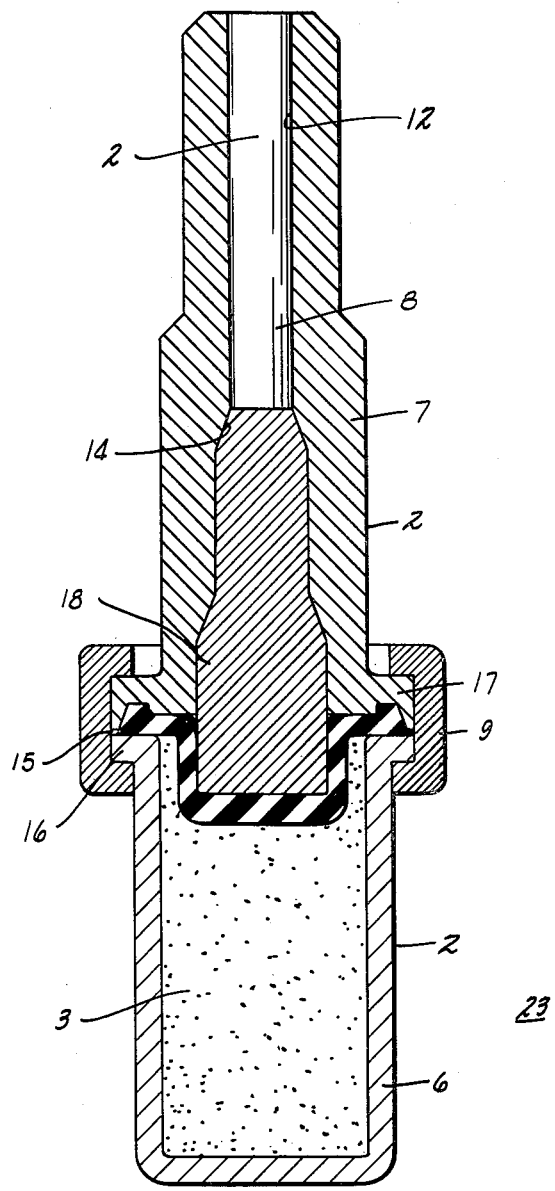

This invention relates to a power element of the type which is operated by fluid pressure. The pressure may be developed by temperature increase in a thermally expansible material or the pressure may be developed by introducing pressure fluid into the power element from an external source.

Power elements of the instant type usually include a diaphragm and plug of rubber or other distortable material between the pressure-producing material and piston or wall member moved by the power element. The plug of distortable material acts to seal the power element against the entrance of ambient fluid into the power element interior. Additionally the plug serves as a mechanism for multiplying the piston travel per given movement of the pressure-producing material. The sealing action and "travel multiplication" are effected by confining the plug in a partially tapered sleeve. During pressure increase the plug is squeezed through the tapered portion of the sleeve. This squeezing of the plug causes it to become elongated and move the piston through a greater distance than the pressure-producing material. Squeezing of the plug also causes the plug to more tightly press against the interior side walls of the sleeve and thereby more effectively seal the power element during return movement of the piston.

During pressure decrease of the pressure-producing material a spring mechanism is usually employed to return the piston and plug into the interior of the power element in accordance with the amount of contraction experienced by the pressure-producing material. Unfortunately the lateral pressures of the plug against the sleeve side walls act to hamper movement of the plug by the spring mechanism. It is desirable that the spring mechanism move the piston and plug as soon as possible in response to contraction of the pressure-producing material, and accordingly the lateral pressure of the plug against the sleeve side walls must be limited. Also, undesired wear of the plug increases at higher lateral pressures. These lateral pressures increase as squeezing of the plug is increased, and since the extent of plug squeezing is determined by the length and angle of the taper in the sleeve, the amount of the taper must be maintained within certain limits. The taper of the sleeve determines the amount of plug elongation and "piston travel multiplication," and limitations on the amount of sleeve taper have in the past limited the "piston travel multiplication" at less than a desirable value.

During piston movement the diaphragm undergoes a linear displacement in accordance with the piston movement. If this linear displacement is allowed to become excessive, undue distortion and rupture of the diaphragm will result. The linear diaphragm displacement is therefore a limiting factor to be considered in the design of a power element.

Objects of the present invention are to provide a power element of the above-mentioned type wherein:

(1) The piston or movable wall undergoes a relatively large movement per given movement of the pressure-producing material, (2) The power element interior is effectively sealed from the ambient atmosphere, (3) The piston or movable wall quickly follows the motion of the pressure-producing material during pressure decrease, (4) The sealing plug undergoes a minimum of wear or "kneading" during power element operation, (5) The sealing plug has a minimum lineal movement per given piston movement so as to reduce plug wear and time lag between pressure change and piston movement, (6) The diaphragm undergoes a minimum linear displacement per unit piston movement, thereby reducing the possibility of diaphragm rupture.

Other objects of this invention will appear in the following description and appended claim, reference being had to the accompanying drawings forming a part of this specification wherein like reference characters designate corresponding parts in the several views.

In the drawings: FIG. 1 is a sectional view through one embodiment of the invention.

FIG. 2 is an elevational view of a sealing plug employed in the FIG. 1 power element, showing the plug configuration prior to installation of the plug in the power element.

FIG. 3 is a sectional view through a diaphragm employed in the FIG. 1 power element, prior to installation of the diaphragm in the power element.

FIG. 4 is a sectional view through a second embodiment of the invention.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

In the drawings there is shown a power element 1 including a housing 2, a body of pressure-producing material 3, a diaphragm 4, and a deformable plug member 5.

Housing 2 includes a cup-like casing 6, a sleeve-forming element 7, and a movable wall or piston 8. A conventional clamping-ring 9 holds element 7 in fixed position on casing 6.

Element 7 forms a plurality of parallel-walled bore portions or passages 10, 11, and 12. Passage 10 is of larger diameter or lateral dimensions than passage 11, and passage 11 is in turn of larger lateral dimension than passage 12. Passages 10, 11 and 12 are connected together by means of outwardly converging passages 13 and 14. The walls of these converging passages serve as shoulders for squeezing plug member 5 during expansive movement of pressure-producing material 3.

Pressure-producing material 3 is in the illustrated embodiment a thermally-expansible material, as for example the material disclosed in United States Patent No. 2,259,846. However the pressure may be developed by introducing a pressure fluid into the power element interior, as illustrated in FIG. 3 of United States Patent No. 2,534,497.

Diaphragm 4 is of vulcanized rubber or other elastic material. It includes an edge portion 15 adapted to be fixedly clamped between flanges 16 and 17 on elements 6 and 7, and an initially thickened central portion 30 for permitting the diaphragm to assume its FIG. 1 position without rupturing.

Plug member 5 is formed of deformable, elastic material such as Ameripol or vulcanized gum rubber. Prior to its installation in the FIG. 1 power element member 5 takes the configuration shown in FIG. 2 wherein cylindrical portion 18 is of larger lateral dimension in the arrow 19 direction than cylindrical portion 20. Portions 18 and 20 are interconnected by a shoulder portion 21. In the FIG. 1 position shoulder 21 abuts against shoulder 13. Portions 18 and 20 are about one or two thousandths inches larger in the arrow 19 direction than corresponding passages 10 and 11 so as to aid in the formation of a tight sealing pressure between the plug and bores when the component elements are in their FIG. 1 positions. The sealing pressure is increased by a spring mechanism (not shown) acting on wall 8 in the direction of arrow 25. This spring mechanism compresses plug 5 between wall 8 and body 3 so that the side surfaces of portions 18 and 20 sealingly press outwardly against surfaces 10 and 11 in the arrow 19 direction.

During expansive movement of material 3 from its FIG. 1 condition, as during temperature increase in ambient atmosphere 23, plug 5 is forced bodily upward through passages 10 and 11. Plug portion 18 undergoes a squeezing action as it passes through the converging passage 13. This squeezing action reduces the lateral dimension of portion 18 and thereby causes member 5 to be elongated. During upward movement of plug 5 portion 20 moves through converging passage 14 into passage 12 so as to further elongate the plug. The plug elongation results in a multiplication of wall 8 movement (as compared with the lineal upward movement of material 3).

During temperature decrease in atmosphere 23, material 3 returns to its illustrated position, and the previously mentioned spring mechanism forces wall 8 down to its illustrated position in bore 12. At the beginning of this downward movement plug portions 18 and 20 are in squeezed conditions in bores 11 and 12, respectively, so as to exert lateral pressures against the bore walls in the arrow 19 direction. These lateral pressures are sufficient to form a pressure seal for sealing the power element interior from atmosphere 23. These lateral pressures tend to increase frictional resistance to downward bodily movement of the plug. However each of plug portions 18 and 20 is squeezed a smaller amount than would be the case if the plug were squeezed by a single larger shoulder, as for example if bore portion 11 was omitted and plug portion 18 were forced past a single shoulder directly into passage 12. And as a result of this "limited" squeezing of plug portions 18 and 20 the lateral pressures are kept at a workable minimum, and frictional resistance to downward movement of the plug is insufficient to cause the plug to lag behind material 3 during temperature decrease. If the plug were to lag behind material 3 a void or vacuum would be created between the plug and diaphragm 4 such as might draw or suck fluid from atmosphere 23 past piston 8 and plug into the power element interior. The time lag is in itself objectionable because it results in delaying the movement of any device controlled by the power element.

It should be noted that the linear movement of plug 5 is considerably less than that of piston 8, due to the plug elongation effected by shoulders 13 and 14. By maintaining the linear movement of plug 5 at a minimum value frictional wear between the plug and bore walls is decreased. In this connection it should be noted that the piston movement distance per volumetric expansion of material 3 could be maintained at its existing value if plug 5 was constructed as a cylindrical element, and the diameter of bore portion 10 was reduced to that of bore portion 11. However such a construction would result in increasing the plug movement and attendant frictional wear between the plug and bore walls. By the present construction plug wear is reduced to a minimum.

It is contemplated that more than two converging passages could be provided if desired, according to the required piston movement per given volumetric expansion of material 3. In this connection it will be appreciated that the movement of piston 8 could be increased by reducing the piston diameter and guide bore diameter, and employing a third converging passage between bore 12 and the newly formed guide bore. The relative diameters of the various parallel-walled passages should of course be so adjusted that the lateral pressures exerted by squeezing of the various plug portions are sufficient to seal the power element interior against the entrance or fluid from atmosphere 23 during downward movement of piston 8 without causing the piston movement to lag behind material 3 movement.

During the foregoing specification piston 8 has been described as a "movable" wall. This will be understood as relative to casing 6. In an absolute sense piston 8 could be immovable, in the same manner for example as piston 22 shown in FIG. 1 of U.S. Patent No. 2,636,776.

With the multi-step design of the present invention it is possible to obtain a large amount of piston stroke practically with a small diameter piston. By properly proportioning the lengths of the various diameters of the plug and the piston guide plug chamber no one cross section area of the plug is required to undergo more than one step of reduction with each step being maintained at a workable ratio. Through the use of two or more steps the area at the base of the plug is maintained at a large ratio relative to the piston area, allowing a sizable volume displacement without distorting the diaphragm excessively along the longitudinal axis.

Two important features of this particular multi-step design are (1) large volume displacement of the diaphragm accomplished by minimum linear displacement but large area displacement of the diaphragm and (2) a workable reduction ratio of the plug for any given cross sectional area.

If desired the plug can be elongated and diaphragm 4 can take the cup-shaped condition indicated in FIG. 4. With the FIG. 4 construction pressure increase in material 3 moves the diaphragm upwardly to the level of flange 16. However, the benefits of the multi-step plug design are retained.

I claim:

A power element comprising a housing; pressure producing material within said housing; wall portions of the housing forming at least three aligned, parallel walled passages of decreasing diameter from the innermost passage to the outermost passage, and a plug-squeezing shoulder at the outer end of each of the two largest passages; a movable piston in the outermost passage; and a deformable plug between the pressure-producing material and movable piston; said plug extending at least partially into each of the aligned passages; whereby during pressure increase of the pressure-producing material the shoulders are each caused to effect a squeezing of a different portion of the plug to give an elongation of the plug which is the sum of the elongations produced by each shoulder; the second largest diameter parallel walled passage being of sufficient length so that plug portions initially engaged with the largest shoulder are prevented from reaching the next adjacent shoulder during normal pressure increase of the pressure-producing material.

References Cited in the file of this patent

UNITED STATES PATENTS

| | | |
|---|---|---|
| 2,115,502 | Vernet | Apr. 26, 1938 |
| 2,534,497 | Albright | Dec. 19, 1950 |
| 2,548,878 | Dillman | Apr. 17, 1951 |